April 2, 1935.  E. A. JOHNSTON ET AL  1,996,246
HARVESTER THRESHER
Original Filed Aug. 5, 1929  5 Sheets-Sheet 1
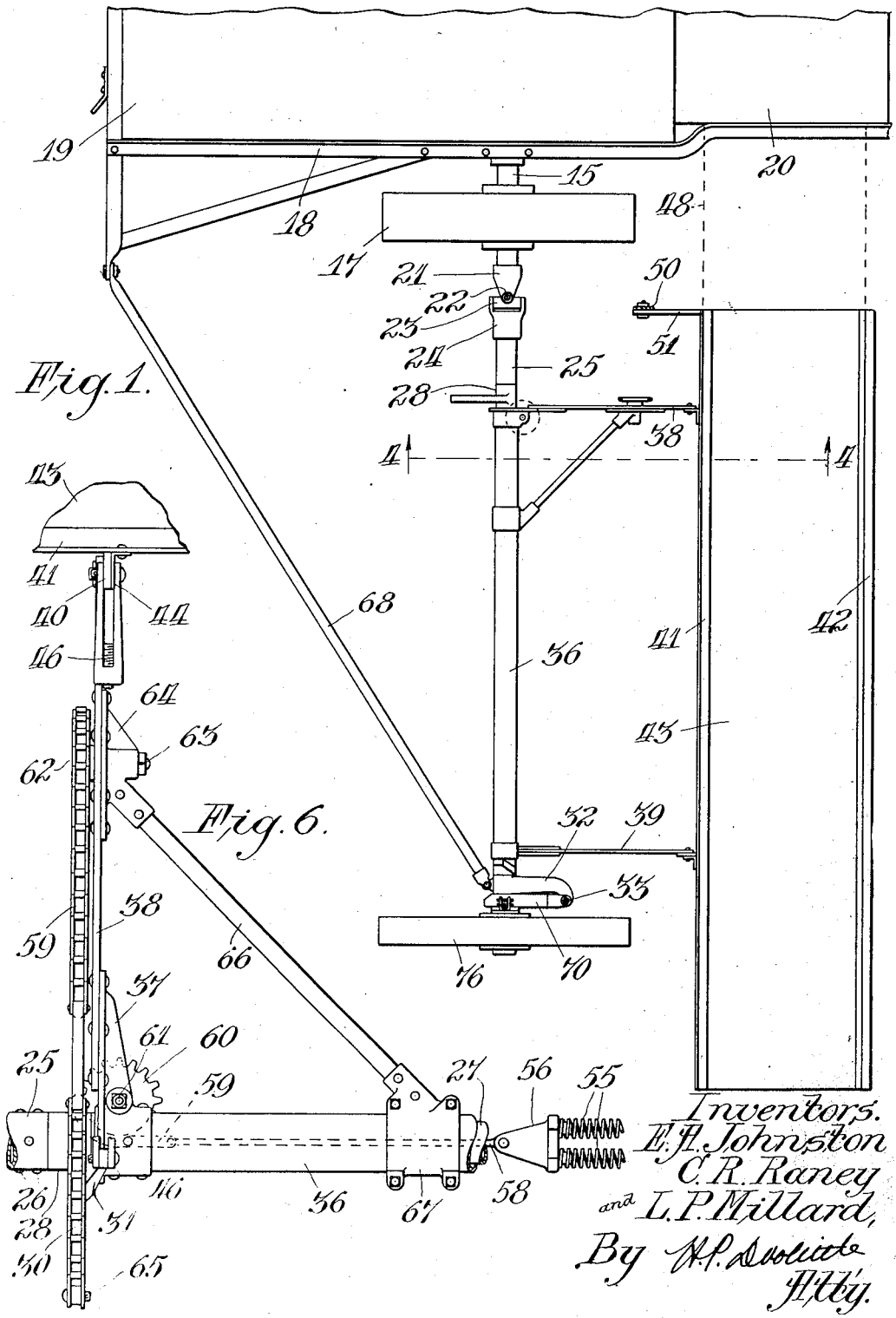

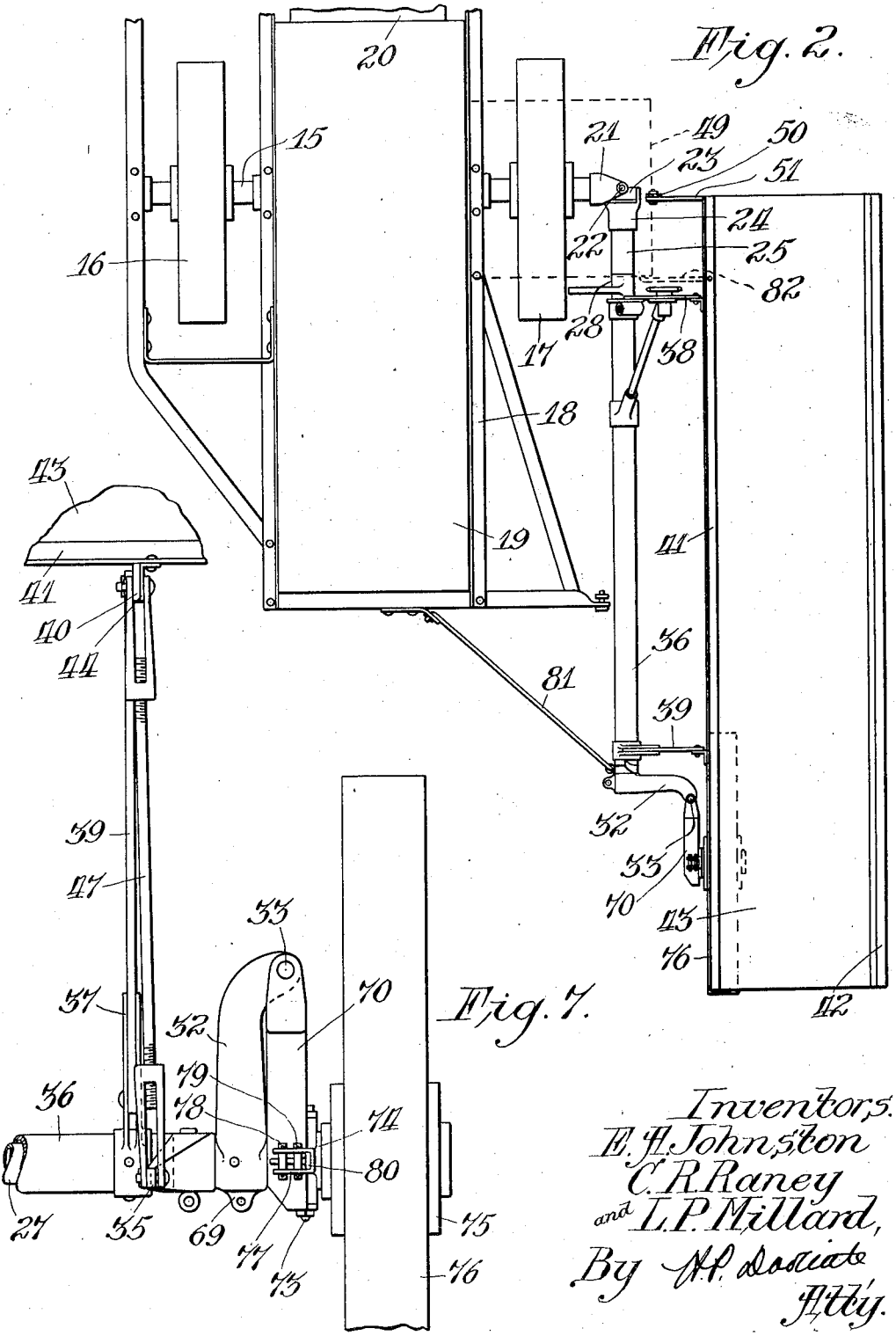

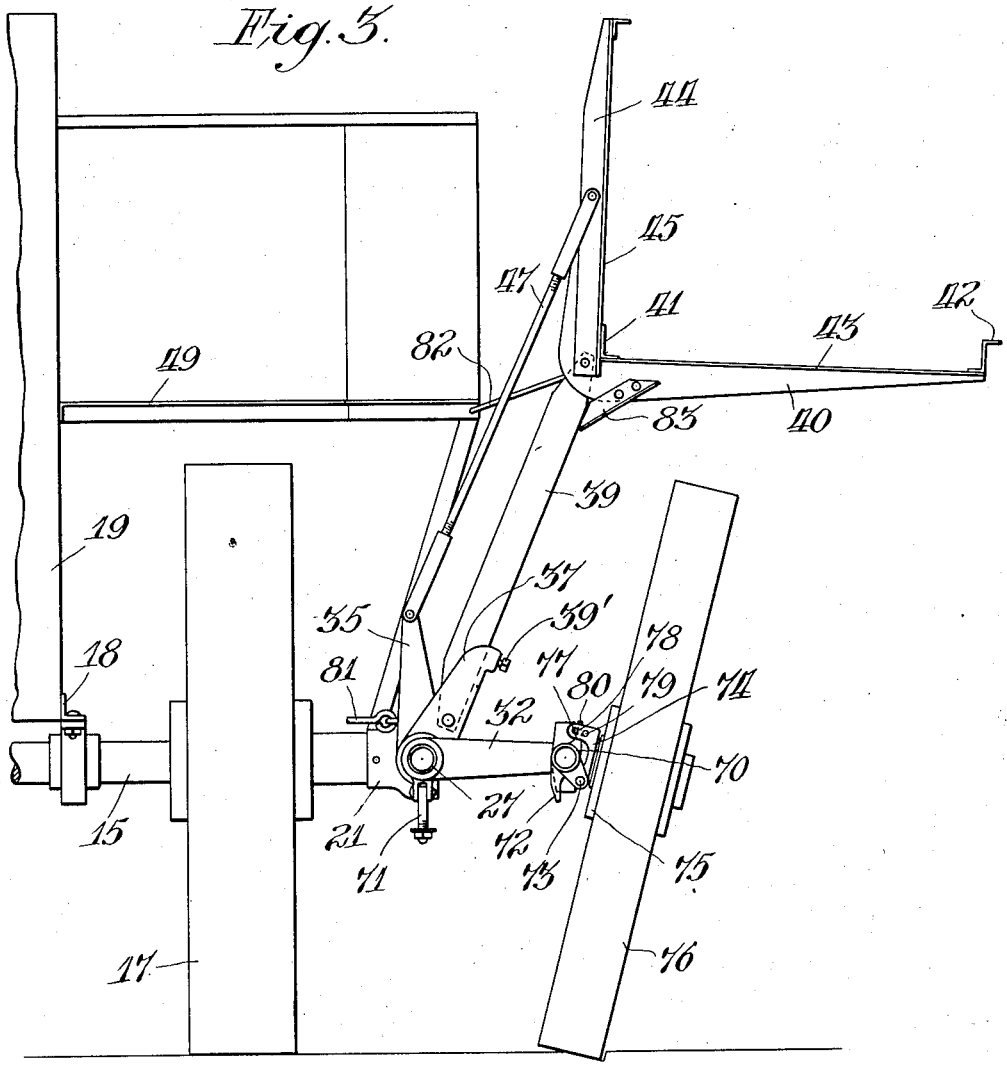
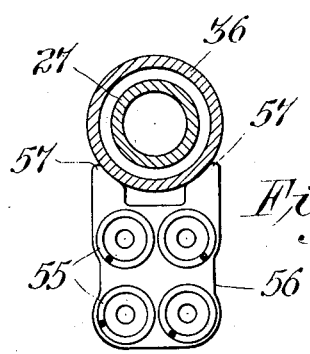

April 2, 1935. E. A. JOHNSTON ET AL 1,996,246
HARVESTER THRESHER
Original Filed Aug. 5, 1929  5 Sheets-Sheet 4

Inventors.
E. A. Johnston
C. R. Raney
and L. P. Millard,
By W. P. Doolittle
Atty.

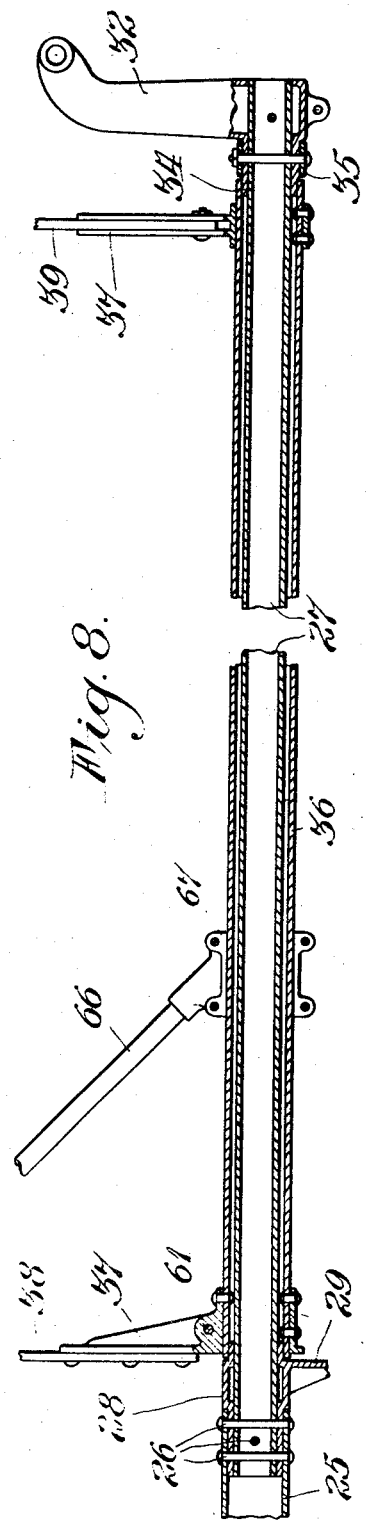
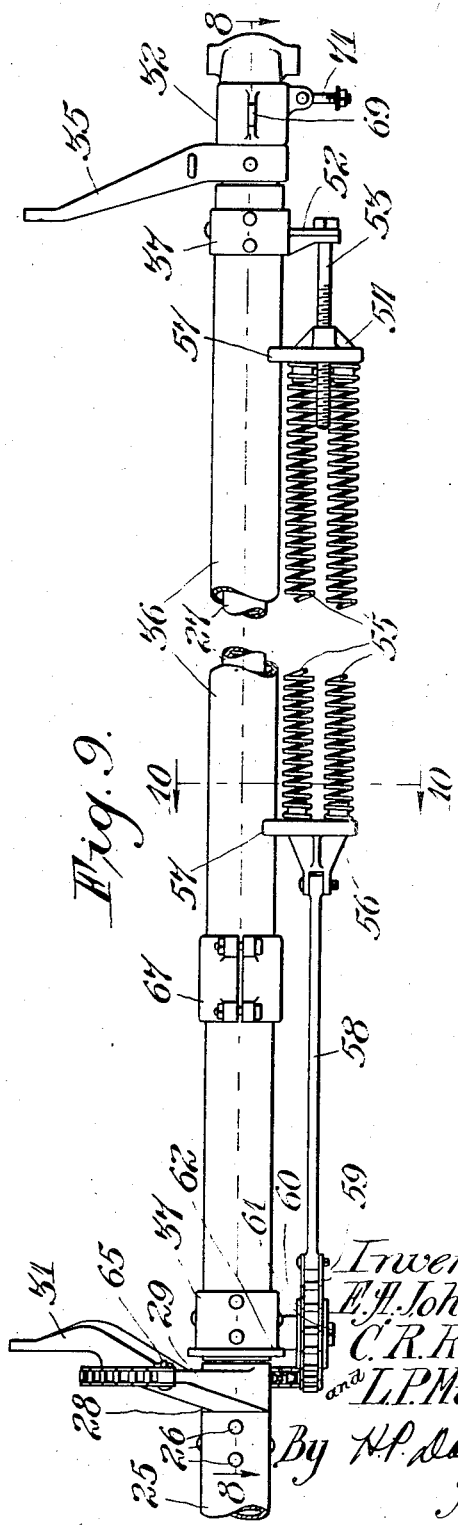

Patented Apr. 2, 1935

1,996,246

UNITED STATES PATENT OFFICE 1,996,246

HARVESTER THRESHER

Edward A. Johnston, Chicago, Clemma R. Raney, Riverside, and Lee P. Millard, Chicago, Ill., assignors to International Harvester Company, a corporation of New Jersey Application August 5, 1929, Serial No. 383,530
Renewed June 16, 1934

26 Claims. (Cl. 56—122)

The invention relates to harvester threshers.

Such machines comprise a thresher part and a harvester part including a header platform, which part in its cutting position extends transversely of the thresher part. Such structure, thus makes for a normal over-all width of the machine too great to enable ready and convenient transport thereof through narrow places, such, for example, as across bridges and between gate posts. It has, therefore, been proposed to hinge the harvester part for folding movement through a horizontal plane to a position within its cutting range alongside the thresher part. Such folding arrangement does in fact narrow the machine to some extent and permits of its passage in transport through places not too narrow. Very often, in practice, however, slight obstructions, such as gate posts and the walls or banisters of narrow bridges, become in fact substantial obstructions that hinder and prevent passage of the machine, because the harvester platform folded back within its cutting range does not provide additional clearance that would make it possible for the machine to clear such an obstruction.

Accordingly, this invention particularly relates to such harvester threshers, in which an additional clearing movement for the harvester platform is afforded to facilitate transportation of the machine.

The primary object of the invention is to provide in a harvester thresher a foldable harvester part capable of an additional clearing movement to a position affording substantially increased ground clearance for transport.

Another important object of the invention is to provide an improved supporting structure for the platform of a foldable harvester part, such structure enabling the platform to be moved in a horizontal position from a position within its cutting range to a position above its cutting range to obtain additional traveling clearance.

Still another desirable object resides in the provision of an improved mechanism for counterbalancing the weight of the platform, such mechanism performing the dual function of counterbalancing the weight of the platform in its cutting position and of assisting movement of the platform to obtain the additional traveling clearance already mentioned.

Other important objects of the invention will become apparent to those skilled in this art as the disclosure progresses.

Very briefly, such objects are achieved in providing a normally transversely extended harvester support which is hingedly connected to the thresher part for folding movement through a horizontal plane to a position longitudinally alongside said thresher part. The harvester support rockingly carries line bars to which in turn is pivotally connected the harvester platform. A spring counter-balance mechanism is connected in a manner to counter-balance up and down movements of the platform as the same is adjusted to vary the height of cut of the harvester. Upon uncoupling of the stubbleward end of the platform from the hand controlled adjusting mechanism, the same with its support is foldable back alongside the thresher part to narrow the machine for transport. Further, said platform, because of its supporting structure on the support, may now be moved from folded position through a vertical plane to obtain additional ground clearance. The counter-balance, without being disturbed, is so constructed that it will exert a lifting force to aid upward movement of the platform. Line links, parallel with the line bars, cause the platform to retain its horizontal disposition at all times.

In the accompanying sheets of drawings illustrating one form which this invention may assume in practice,—

Figure 1 is a general plan view of the harvester thresher, only a fragment of the thresher part being shown;

Figure 2 is a view similar to Figure 1 with more of the thresher part shown, and the harvester part folded;

Figure 3 is a rear, elevational view to show the position assumed by the platform when in transport position;

Figure 6 is a fragmentary plan view showing the stubbleward line lever, harvester support, and counter-balance mechanism;

Figure 7 is a similar fragmentary plan view, but illustrating the grainward line lever and the grain wheel for the harvester support;

Figure 8 is a horizontal sectional view through the harvester support as seen along the section line 8—8, looking with the arrows appearing in Figure 9;

Figure 9 is a rear elevational view of the harvester support associated with the counter-balancing mechanism; and, Figure 10 is a detail, sectional view along line 10—10, looking with the arrows appearing in Figure 9, and showing a guide bracket for the counter-balance springs.

Figure 4:
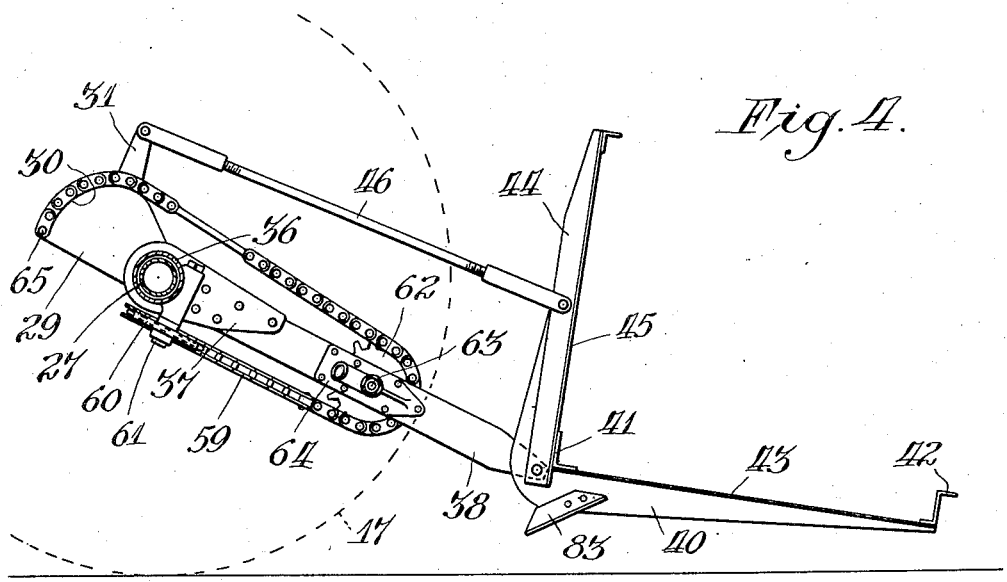
Figure 4 is a side sectional view through the platform and its supporting structure, as viewed along the line 4—4 appearing in Figure 1, when looking in the direction of the arrows.

The harvester thresher chosen for purposes of illustration embodies, as best shown in Figure 2, a transversely disposed, non-rotatable axle 15, carried in a main wheel 16 and an intermediate wheel 17. Said axle, in any approved manner, carries the thresher part of the machine, which part comprises a frame 18 and separator 19, with a feeder house 20 located in the usual way in advance thereof. See also Figure 1.

The axle 15 is projected through the intermediate wheel 17 and at its free end carries fast thereon a cap 21 including a vertical hinge pin 22. Said pin 22 is connected to a horizontal hinge pin 23 carried by a cap piece 24 secured to an extension axle piece 25 of short length and dead in the sense that it, like the axle 15, does not rotate on its axis. The pins 22, 23 thus form a two-way hinge for a purpose presently to appear.

The piece 25 may in practice be a tube, as best appears in Figure 8, which has telescoped thereinto and made fast thereto by rivets or bolts 26, a normally transversely extending torque tube 27 comprising a non-rotatable harvester axle support, as later appears. Between the piece 25 and tube 27 is made fast a short sleeve 28 including a fixed, upwardly and rearwardly extending bracket 29 having formed thereon a cam surface 30 and an upstanding arm 31. The opposite, or grainward end of the torque tube has similarly made fast thereto, a forwardly extending bracket 32 having its front end curved slightly out in a grainward direction and provided with a vertical hinge pin 33. See also Figure 7. The bracket 32, as shown in Figure 8, includes a hub 34 also secured to the tube 27, and fast on said hub is an upstanding arm 35. See Figure 9.

It will be noted at the stubbleward end of the tube 27 that the part 28 includes a short, grainwardly extended bearing portion, and at the grainward end of the tube, that the hub 34 is slightly projected stubblewardly to form another bearing portion. These two bearing portions carry for turning movement about the axis of the tube 27, an elongated sleeve support 36 which has made fast thereto at each opposite end, a forwardly extending line bracket 37.

These brackets 37 constitute a part of the structure for supporting a harvester platform, as will next be described.

Figure 5:
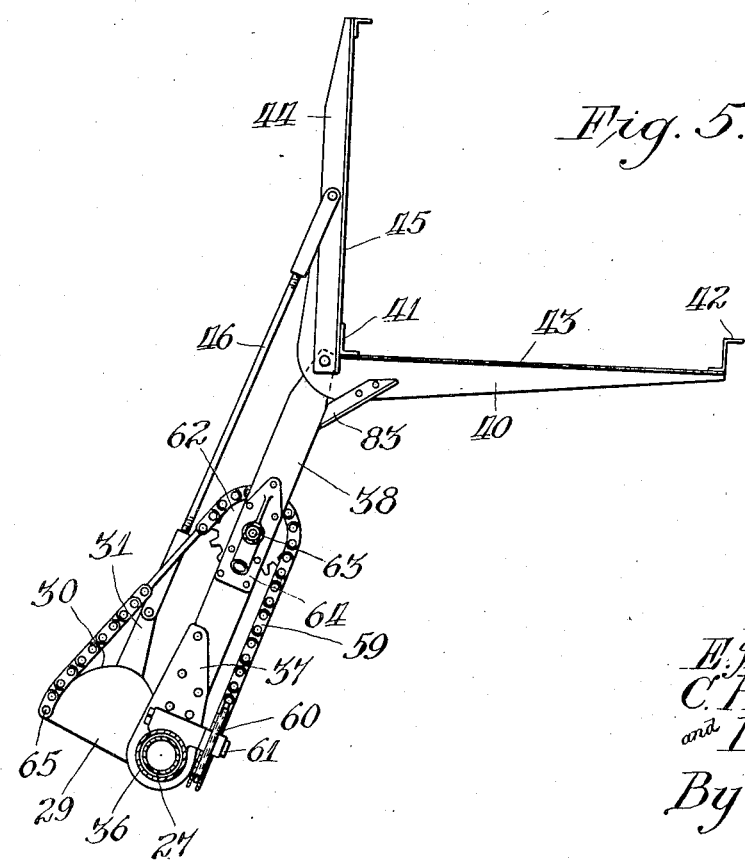
Figure 5 is a view similar to Figure 4, but showing the platform raised above its cutting range to obtain additional ground clearance.

The stubbleward bracket 37 has rigidly secured thereto a forwardly extending line lever or bar 38, while the grainward bracket 37, which is of channel form, pivotally carries a line lever or bar 39. Such mounting is standard in the art and involves a set screw 39′ (see Figure 3) to adjust said line lever to take up sagging that may occur at the grainward end of the platform which is supported by said line levers, as will now be explained. As best shown in Figures 3, 4 and 5, each line lever 38, 39 has pivotally connected to it an angular frame piece 40, there being two such pieces. At the angle in said pieces is arranged the rear, transverse angle bar 41 and, at the front, the pieces carry the usual transverse platform Z-bar 42. The platform appears at 43. Such platform, it will be understood, includes the usual conveyor and cutting mechanism which have not been shown. The platform structure also involves the uprights 44 for mounting a backboard 45.

Pivotally connected between the arm 31 and an upright 44 is an adjustable line link 46 disposed above the line lever 38 and substantially parallel therewith. Similarly the line lever 39 has arranged thereabove, a line link 47 (see Figures 3 and 7), which link is pivotally connected between the arm 35 and an upright 44.

The platform conveyor moves the gathered material to a spout 48 indicated generally in dotted lines in Figure 1, said spout preferably being a part of the platform structure and loosely or removably inserted into an open side of the feeder housing 20 to discharge the grain thereinto as is well understood in this art.

The platform, in its normal cutting position, must, of course, be adjustable up and down to regulate the height of cut. Accordingly, an operator's bridge or deck 49, shown in dotted lines in Figure 2, and in full lines in Figure 3, is provided, said deck mounting, in any conventional way, a tiller wheel, or similar device, not shown, for pulling up or pushing down on a vertically arranged link 50 (see Figure 1), which in turn is releasably connected to an arm 51 extending back from the stubbleward end of the platform structure. In this manner, the platform and with it the cutting apparatus is raised and lowered.

The great weight of the platform makes it necessary to provide a counter-balancing mechanism to make such adjustments of the platform easy. As the platform is foldable for transport, it is desirable that such counter-balancing mechanism be of a kind that need not be disturbed when effecting such folding operation. Therefore, springs are used and form a self-contained integral part of the harvester which always remains in place, and not requiring disconnection.

For this purpose, a bracket 52 (see Figure 9) is connected to the grainward end of the sleeve support 36. The bracket carries a bolt 53 threadedly connected to a header 54, which carries one end of a battery of springs 55 parallel with and underneath the harvester support, as shown in the drawings. The springs at their stubbleward end are carried by another header member 56 having portions 57 (see Figure 10) to slidingly engage the sleeve 36 in the manner shown.

Pivotally connected to the header 56 is a transverse link 58 which has its stubbleward end connected to a flexible element, such as a chain 59, that is trained around a substantially horizontally disposed, idler sprocket wheel 60 (see also Figure 6) carried loose on a vertical pin 61 arranged in the bracket 37 heretofore described. The chain 59 then runs forwardly, as shown in Figures 4 and 5, and upwardly around a vertically running idler sprocket wheel 62 carried on a horizontal pin 63 arranged in a bracket 64 carried near the forward end of the line lever 38. Thence, the chain runs back again above the line lever 38 and over the cam 30 heretofore described, the end of the chain being anchored at 65 to the rear end of said cam. See Figures 6 and 9. A cross-brace 66 extends from the bracket 64 to another bracket 67 bolted over the sleeve 36.

A diagonally disposed brace 68 is removably connected between an extension of the thresher frame and an eye 69 at the back end of the arm 32. This brace functions in the usual way to maintain the harvester in its normal, transverse cutting position, as shown best in Figure 1.

Looking especially to Figures 1, 2, 3 and 7, it is to be noted that a special form of combined grain and caster wheel structure is provided.

This structure includes an arm 70 having a forward, bifurcated end connected for pivotal movement about the pin 33. Normally, the arm 70 extends back closely alongside the bracket 32. Said bracket 32 on its under side pivotally carries a bolt latch 71 (see Figure 3) which is adapted to fit between the legs of a depending fork 72 and be locked thereto, to hold the bracket 32 and arm 70 together, as shown in Figure 7. The arm 70 includes a bore receiving a hinge pin 73 to which is hingedly connected an extension member 74 of a wheel hub 75 for the wheel 76. The member 74 includes a horizontally disposed, bifurcated piece 77, which carries two spaced bolts 78, 79. Further, the arm 70 carries an upstanding lug 80.

In transverse cutting position of the harvester support, the wheel 76 is fixed for only turning movement, by which is meant that the same does not caster. Such position appears in Figure 7, it being understood that the two members 32, 70 are latched together and that the lug 80 is in the space between the bolt 79 and the bight portion of the piece 77, which causes the wheel to turn in a vertical plane.

However, when the support 25, 27 is to be folded back for transport, the arm 70 is freed from the bracket 32 by uncoupling the latch bolt 71 and removing the pin 79 which permits the user to hinge the wheel 76 outwardly about the pin or hinge 73 to the tilted position of Figure 3, in which said wheel will best function as a trailing, castering wheel.

In folding the harvester support back, as shown in Figure 2, it is necessary to remove the brace 68. After the support has been folded, another brace 81 is employed to hold the support in place; similarly, a link 82 is employed between the framework of the deck 49 and the platform further to brace the structure during transport.

In operation the harvester support comprising the parts 25, 27 and 36 are a unit disposed in transverse position for cutting, as appears in Figure 1. The spout 48 is inserted into the feeder house 20 and the grain gathered by the platform is fed thereinto and thence through the separator 19 for threshing. In this position the grain wheel 76 is held, as shown in Figure 7, for turning movement only. In other words, it does not now caster. By means of the parts 50, 51, an operator on the deck 49 may raise or lower the platform to adjust the height of cut. The counter-balance springs 55 exert a force to make such adjustments easy of accomplishment by counterbalancing the weight of the platform, and such parts as the spout and reel carried thereby. During such adjusting movements, the platform is caused to remain substantially horizontal because of the links 46, 47 arranged in parallel with the respective line levers 38, 39. It is also of interest to note that the pull of the springs 55 will be substantially uniform in all positions which the platform assumes because of the compensating effect of the cam 30.

When the platform is so adjusted, the sleeve 36 turns about the dead axle support 27. Said support, because of the horizontal hinge pin 23, is capable of floating when the harvester part travels over sloping ground.

The structure of the invention, however, has its main advantage arising from the facility with which the machine can be narrowed for transport. This is accomplished by folding the support and with it the harvester platform. Upon removal of the diagonal brace 68, the whole harvester part can be swung around the pivot 22 from the position shown in Figure 1 to the position shown in Figure 2. First, the brace 68 is removed. Then the grain wheel is freed for castering movement by unlatching the latch bolt 71, and also tilted to the position shown in Figure 3 in the manner already described. The part 50 is disconnected next from the arm 51. Thus, the entire harvester part is freed for folding movement, the parts 25, 27, 36 moving through a horizontal plane to narrow the harvester thresher. The operator then pushes up on the platform, the springs 55 at the same time exerting a lifting force to raise the platform to a position, as shown in Figure 3, affording a very desirable additional clearance with respect to ground obstructions. The springs 55 are preferably so tensioned that they are effective to raise the platform to its elevated clearance position above cutting range at the same time that the support is being swung back horizontally. The platform may swing up in this fashion because the line levers with the sleeve 36 may turn about the dead axle support 27. Further, the pivotal mounting of the platform on the free ends of these line levers, and the provision of the line links 46, 47 parallel with the said line levers causes the platform to remain horizontally disposed during and after the folding operation. As the spout 48 is a part of the platform and is only loosely inserted into the feed house 20, it pulls out and folds back and up with the platform. The reel, not shown, will remain on the platform even when folding the harvester. Of course, the driving connections for the reel must be disconnected, as will be understood by those familiar with these machines. The braces 81, 82 are then placed as has been described, and the machine is ready for transport from field to field, over narrow roads, bridges, through gates, and the like. Stops 83 may be provided as shown in Figures 4 and 5 between the members 40 and line levers to prevent jack knifing of the pivots between the platform and line levers over dead center.

It is of interest to note that the wheel 76, when it trails and casters, is arranged underneath the platform in a position where it can best support the weight thereof. Further, the whole machine is so constructed that the folding operation can easily be effected by one man, and, because of the dual function counter-balancing springs, that that one man need not exert any strenuous physical force.

Re-location of the harvester part in cutting position is also a simple matter, and obviously involves nothing more than a reversal of the steps just described.

From this disclosure and description, it is now clear that structure has been provided which effectively achieves all of the desirable objects heretofore set out for the invention.

It is to be understood that only an illustrative embodiment of the invention has been herein disclosed, and that such embodiment is susceptible of many changes and modifications. The intention is to cover all such changes as do not depart from the spirit of the invention as is indicated by the scope of the appended claims.

What is claimed is:

1. In a harvester thresher, a thresher, a harvester support, means connecting the support to the thresher to be movable with respect to the thresher to obtain clearance for transport, a platform, means connecting the same to the support so that the platform is movable upwardly with respect to the support to obtain additional transport clearance, and means to maintain the platform substantially horizontal in such position.

2. In a harvester thresher, a thresher, a harvester support hingedly connected thereto for folding movement alongside the thresher, line levers, means carrying the line levers on the support for upwardly swinging movement, and a platform pivotally connected to the free ends of the line levers, whereby the platform may be moved to a position to obtain additional clearance when transporting the harvester thresher.

3. In a harvester thresher, a thresher, a harvester support foldingly connected thereto, line levers, means carrying the line levers on the support for upward swinging movement about the axis thereof, and a platform pivotally mounted on the free ends of said line levers by which additional traveling clearance is obtained.

4. In a harvester thresher, a thresher, a harvester support foldingly connected thereto, line levers, means carrying the line levers on the support for upward swinging movement about the axis thereof, a platform pivotally connected to the free ends of said line levers, and means to maintain the platform in substantially horizontal position when the line levers are swung upwardly obtaining additional transport clearance.

5. In a harvester thresher, a thresher, a harvester support hingedly connected thereto for folding from cutting to a traveling clearance position, a platform, means connecting the platform to the support for movements within its cutting range and to obtain an additional movement for additional traveling clearance, spring means to counter-balance said platform in cutting position, said means also exerting a force to assist movement of the platform to its additional traveling clearance position.

6. In a harvester thresher, a thresher, a harvester platform, means connecting the platform to the thresher to make the same movable from cutting position to a position alongside the thresher above its cutting range, and common means comprising a spring structure for counter-balancing the platform in cutting position and for exerting a lifting force to move said platform to the position mentioned to obtain traveling clearance.

7. A harvester thresher having a thresher and a platform normally extended into cutting position, said platform including connections with the thresher to enable movement of the same to a horizontal position folded alongside the thresher higher than its cutting range to obtain traveling clearance, and a common means comprising a spring structure for counter-balancing the platform in cutting position and to exert a force to move the platform to such folded position.

8. A harvester thresher having a thresher, a platform connected thereto, said platform being movable from horizontal cutting position about two axes to a transport clearance position alongside the thresher, and means to maintain the platform substantially horizontal during and at the termination of such movement.

9. A harvester thresher having a thresher, a platform connected thereto, said platform being movable from horizontal cutting position through horizontal and vertical planes to a transport position alongside the thresher, and means to maintain the platform substantially horizontal in such transport position.

10. A harvester thresher having a thresher, a hinged support extending therefrom, a platform hingedly carried by the support, a wheel to support the free end of the support, said support with the platform and wheel adapted for folding movement to a transport position alongside the thresher, said platform having connections adapting the same for movement to a raised position to obtain additional transport clearance with the wheel located below the platform.

11. In a harvester thresher, a thresher, a dead axle hingedly connected to the thresher, means rockable about said axle, line levers supported on the rockable means, a platform pivotally carried on the line levers, arms carried on the dead axle, and line links substantially parallel with the line levers, said links being connected between the arms and the platform.

12. In a harvester thresher, a thresher, a dead axle hingedly connected to the thresher, a sleeve rockable about said axle, line levers supported on the sleeve, a platform pivotally connected to the line levers, a backboard for the platform, arms carried by the dead axle, and line links substantially parallel with the levers, said links being pivotally connected to said arms and to said backboard.

13. In a harvester thresher, a thresher, a dead axle floatingly and foldingly connected to said thresher, means rockable about said axle, line levers carried by said rockable means, a platform pivotally supported by the levers, arms on the dead axle, upright means at the back of the platform, and line links pivotally connected to the arms and to said upright means.

14. A harvester thresher having a thresher, a platform connected thereto, means connecting said platform to the thresher whereby said platform is movable backwardly to a folded position alongside the thresher, and means for causing the platform to be moved upwardly simultaneously with its backward movement.

15. A harvester thresher having a thresher, an axle flexibly connected thereto, a platform carried by the axle, connections whereby said axle with the platform is foldable alongside the thresher, and means to cause the platform to be moved to a raised position as the axle is folded.

16. A harvester thresher having a thresher, an axle flexibly connected thereto, a platform carried by the axle, said axle being foldable in a horizontal plane to carry the platform to a position alongside the thresher, and means for automatically elevating the platform with respect to the axle as the same is folded.

17. In a harvester thresher, in combination, a thresher part, a harvester part including a platform, connections intermediate the platform and thresher part whereby a relative movement of said parts in a plurality of angular directions obtaining traveling clearance for the platform may be obtained, and means to maintain the platform substantially horizontally disposed during and at the completion of said movements.

18. In a harvester thresher, in combination, a thresher part, a harvester part including a platform, a double set of flexible connections intermediate the platform and thresher part whereby movement of the platform in two angular directions to obtain clearance may be obtained, and means to maintain the platform in a substantially horizontal position during and at the completion of such movements.

19. In a harvester thresher, a thresher, a harvester support, a platform carried by the support, connecting means between the support and the thresher by which the platform with the support may be swung from cutting position to a folded position alongside the thresher for transport clearance, and connections between the platform and support by which the platform may be elevated in substantially horizontal position above the support and above its cutting range to obtain additional clearance.

20. A harvester thresher having a thresher part, a normally transverse support hingedly connected thereto for horizontal folding movement to a position longitudinally alongside the thresher, line levers normally substantially horizontally disposed and connected to the support for folding movement to a substantially upright elevated position, a harvester platform hingedly carried on the free ends of said line levers, and means to retain the platform and line levers in such elevated position.

21. A harvester thresher having a thresher part, a normally transverse support connected by a two way hinge to the thresher part for vertical floating pivotal movement and for folding movement to a position longitudinally alongside the thresher, line levers normally extending substantially horizontally from the support and being connected thereto for swinging movement to a substantially upright elevated position, and a harvester platform hingedly carried on the free ends of said line levers.

22. In a harvester thresher, a thresher, a harvester support means foldingly connected to the thresher for movement from a normal transverse position to a longitudinal position alongside and parallel with the thresher during transport, platform supporting members connected with the support means, a platform pivotally carried by said supporting members, said platform being movable in a plane within its cutting range with the support means to the folded position mentioned, means operative to draw the platform upwardly to an elevated position above its cutting range to obtain additional travel clearance, and means to maintain the platform substantially horizontal.

23. In a harvester thresher, a thresher, a harvester support means foldingly connected to the thresher for movement from a normal transverse position to a longitudinal position alongside and parallel with the thresher during transport, platform supporting members connected with the support means, a platform pivotally carried by said supporting members, said platform being movable in a plane within its cutting range with the support means to the folded position mentioned, said platform supporting members being movable upwardly about the axis of the support means to carry the platform to an elevated position above its cutting range to obtain additional travel clearance, the platform in normal cutting position being counterbalanced by means which is not removed in obtaining the travel clearance movements of the platform, and means to keep the platform substantially horizontal.

24. In a harvester thresher, a thresher, a harvester support means foldingly connected to the thresher for movement from a normal transverse position to a longitudinal position alongside and parallel with the thresher during transport, platform supporting members connected with the support means, a platform pivotally carried by said supporting members, said platform being movable in a plane within its cutting range with the support means to the folded position mentioned, (a combination grain and caster wheel carrying the support means, said wheel embodying means to fix the wheel against castering in the cutting position of the platform and which means may be freed to enable the wheel to caster in the folded position of the platform,) means to move the platform upwardly to an elevated position above its cutting range to obtain additional travel clearance, and means to keep the platform substantially horizontal.

25. In a harvester thresher, a thresher, a harvester support means foldingly connected to the thresher for movement from a normal transverse position to a longitudinal position alongside and parallel with the thresher during transport, platform supporting members connected with the support means, a platform pivotally carried by said supporting members, said platform being movable in a plane within its cutting range with the support means to the folded position mentioned, (a combination grain and caster wheel carrying the support means, said wheel embodying means to fix the wheel against castering in the cutting position of the platform and which means may be freed to enable the wheel to caster in the folded position of the platform,) said platform members being movable upwardly about the axis of the support means to carry the platform to an elevated position above its cutting range to obtain additional travel clearance, the platform in normal cutting position being counterbalanced by means which is not removed in obtaining the travel clearance movements of the platform, and means to keep the platform substantially horizontal.

26. A harvester thresher having a thresher, a platform connected thereto, said platform being movable from horizontal cutting position about two axes to a transport clearance position alongside the thresher to locate the same above its cutting range, a support for the platform, (a combination grain and caster wheel for the support, said wheel embodying release means whereby the wheel may be made to caster or be restrained against castering as desired,) and means to maintain the platform in substantially horizontal position in its transport position.

EDWARD A. JOHNSTON.
CLEMMA R. RANEY.
LEE P. MILLARD.